United States Patent [19]

Brissette

[11] Patent Number: 4,460,183
[45] Date of Patent: Jul. 17, 1984

[54] RESILIENT SEALING MEMBER FOR SLIP-TYPE DRIVE SHAFT

[75] Inventor: Ronald N. Brissette, Medina, Ohio

[73] Assignee: Rockwell International Corporation, Pittsburgh, Pa.

[21] Appl. No.: 514,061

[22] Filed: Jul. 15, 1983

[51] Int. Cl.³ .................... F16J 15/32; F16D 3/06; F16D 3/84
[52] U.S. Cl. ............................. 277/12; 277/30; 277/152; 464/131; 464/162
[58] Field of Search ............... 277/12, 32, 30, 31, 277/152, 153; 464/131, 162, 173

[56] References Cited

U.S. PATENT DOCUMENTS

| | | | |
|---|---|---|---|
| 3,234,758 | 2/1966 | Lewis | 464/162 X |
| 3,411,793 | 11/1968 | Jagger et al. | 277/32 |
| 3,942,336 | 3/1976 | Schultenkamper | 464/162 |
| 4,116,019 | 9/1978 | Welschof | 464/131 |

FOREIGN PATENT DOCUMENTS 2708137  6/1978  Fed. Rep. of Germany ...... 464/131

Primary Examiner—Robert S. Ward

[57] ABSTRACT

A one piece sealing member for a slip type driveline assembly to prevent loss and contamination of lubricant. The sealing member is made of a resilient material and has a cylindrical wall and integral radially inwardly extending circumferential annulus. The wall and annulus generally complement and mate with the cylindrical end of a slip yoke that has a groove on its surface to receive the annulus. The cylindrical wall is joined to a radially inwardly extending wall which in turn is joined to a radially inwardly converging truncated conical wall. The truncated conical wall terminates at a radially outwardly extending reinforcing rib.

11 Claims, 8 Drawing Figures

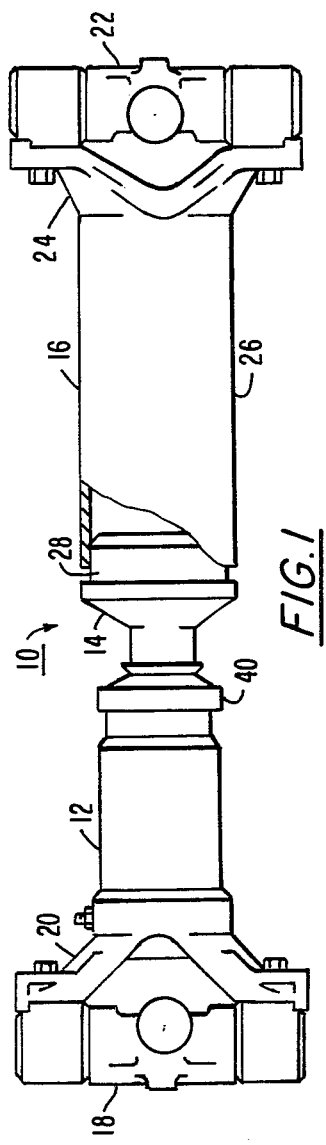
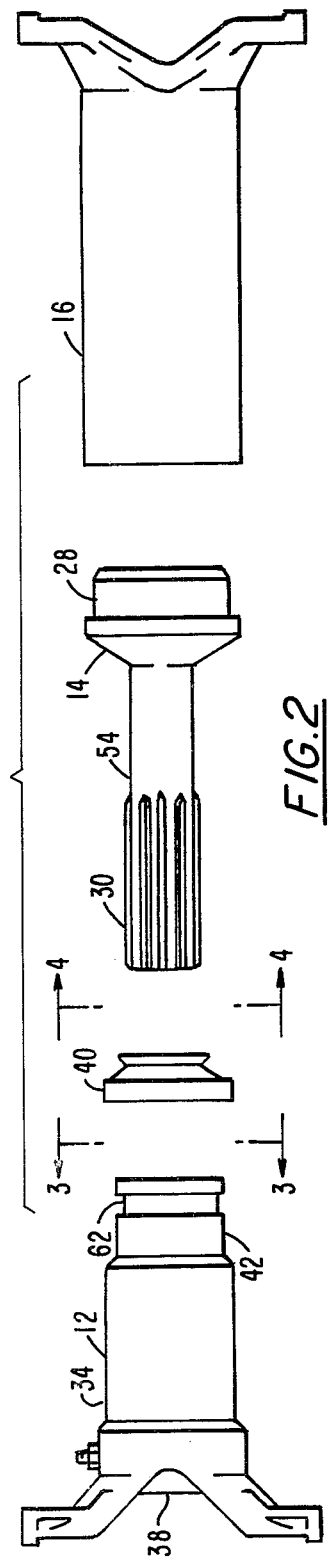

RESILIENT SEALING MEMBER FOR SLIP-TYPE DRIVE SHAFT

FIELD OF INVENTION

This invention relates to a resilient sealing member and in particular to a resilient sealing member for a driveline assembly.

BACKGROUND OF THE INVENTION

Driveline assemblies are a type of power take off assembly that transfers torque loads from a driving member to a driven member. The driveline assembly usually has a universal joint at each end. The typical cardan type universal joint is basically made up of two yokes each connected to a single center cross with four needle bearings. A fixed driveline assembly is used in applications where the required length of assembly does not vary such as power steering unit. A slip type or telescoping assembly is designed for applications in which the length of the assembly may vary during its normal operation because of application movement or function such as driveline connections between tandem drive axles for truck and tractor applications. Typical inter-axle slip type driveline assemblies can operate up to a 45° angle and can have length variations in excess of 12 inches.

The slip type assembly is generally of a sliding spline design. A spline plug is fitted into a slip yoke with an internal spline that generally mates with the external spline of the spline plug. A tube and weld yoke assembly is generally pressure fit and welded to the spline plug. Universal joint assemblies are attached to each yoke completing the assembly. The splined cavity within the slip yoke generally contains lubricants and is sealed by a plug and a seal which keeps the lubricants in and contaminants out.

The seal is generally one of two types: multi-component or one piece. With multiple-component seals, one or more split washers with internal splines are positioned over the end of the slip yoke and held in place by a threaded metal dust cap. The washer sets are usually of metal and cork or nylon and felt construction. With single piece construction, the dust cap is generally rubber with an internal thread that allows it to be screwed over the end of a slip yoke with matching external threads. The outer surface of the threaded portion of the seal is generally bonded to a metal band that helps maintain the overall seal geometry and prevents thread deformation.

In both arrangements there must be internal threads on the dust seal and corresponding external threads on the slip yoke. These threads on the slip yoke are susceptible to damage in handling and tight controls are required in processing.

SUMMARY OF THE INVENTION

The object of this invention is to provide a resilient sealing member for a driveline assembly.

This and other objects are disclosed in the preferred embodiment which provides a one piece resilient sealing member that is mounted on the slip yoke of a driveline assembly at the interface between the slip yoke and spline plug. The preferred sealing member is a resilient neoprene compound with a durometer hardness of 60 to 70. The sealing member has a cylindrical wall with an inner diameter equal to the outer diameter of the slip yoke body. The cylindrical wall is joined to a radially inwardly extending wall which in turn is joined to a radially inwardly converging truncated conical wall. In a preferred embodiment, the diameter of the opening formed by the truncated conical wall is generally slightly less than the diameter of an unsplined section of the spline plug. The truncated end of the conical wall is joined to a radially outwardly extending reinforcing rib.

In the preferred embodiment of the sealing member, the thickness of the truncated conical wall decreases uniformly from its juncture with the radially inwardly extending wall to its juncture with the reinforcing rib.

The preferred sealing member is provided with an integral circumferential annulus formed on the inner surface of the cylindrical wall. The circumferential annulus fits into a complementing circumferential groove formed on the outer surface at one end of the slip yoke thus attaching the resilient sealing member to the slip yoke and containing the lubricant in the slip yoke while preventing dust contamination. The circumferential annulus is preferably centered on the inner surface of the cylindrical wall of the sealing member.

BRIEF DESCRIPTION OF THE DRAWINGS

FIG. 1 is a plan view of an assembled driveline assembly with a partial cutaway view.

FIG. 2 is an exploded view of a driveline assembly without the universal joint cross connection.

FIG. 3 is an end view of the slip yoke taken through line 3—3 of FIG. 2.

FIG. 4 is an end view of the spline plug taken through line 4—4 of FIG. 2.

DESCRIPTION OF THE INVENTION

Figure 5:
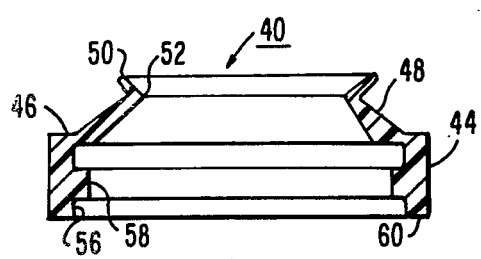
FIG. 5 is a cross section of the preferred resilient sealing member.
Figure 7:
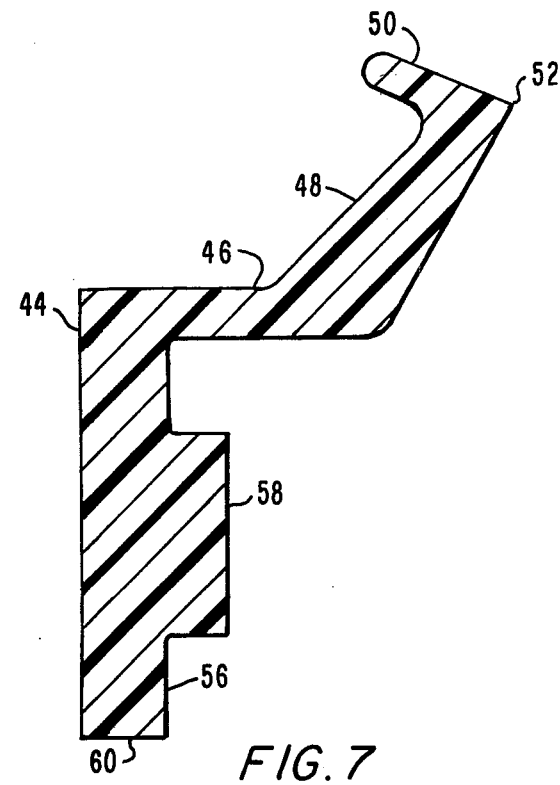
FIG. 7 is an enlarged cross section of the preferred resilient sealing member's wall.
Figure 6:
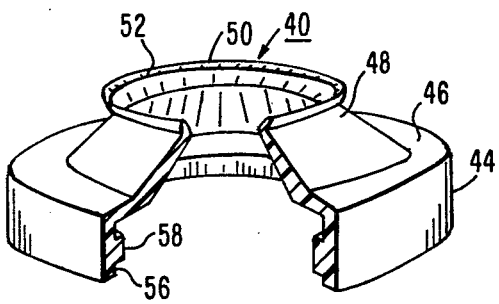
FIG. 6 is a cutaway isometric view of the preferred resilient sealing member.
Figure 8:
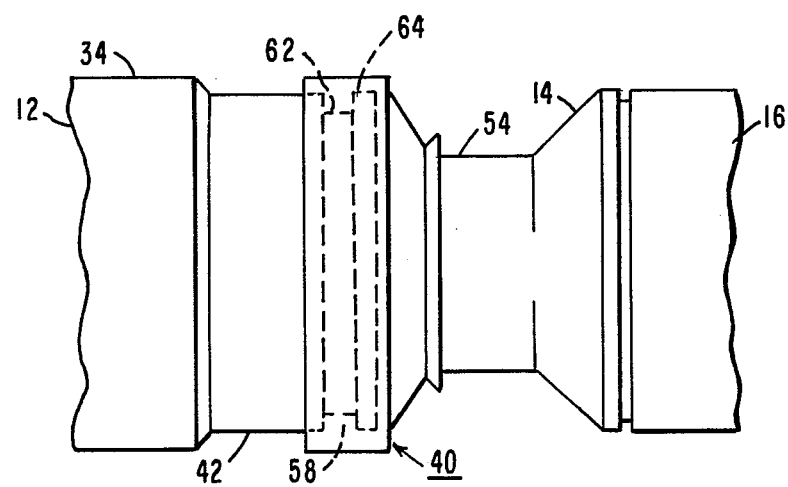
FIG. 8 is an enlargement of an assembled slip yoke, sealing member and spline plug.

The preferred driveline assembly 10 as shown in FIG. 1 consists generally of a slip yoke 12, a spline plug 14 and a tube and weld yoke assembly 16. A cross and bearing kit 18 is bolted to yoke 20 of slip yoke 12 and a cross and bearing kit 22 is mounted to yoke 24 of the tube and weld yoke assembly 16. The tubing section 26 of the tube and weld yoke assembly 16 is pressure fit over the cylindrical end 28 of the spline plug 14. The splined end 30 of spline plug 14 is slidably received into the splined cavity 32 of the cylindrical body 34 of slip yoke 12. FIG. 3 shows the internal splined cavity 32 of slip yoke 12 while FIG. 4 shows the corresponding external spline surface 36 of spline plug 14. Lubricant within splined cavity 32 helps the easy movement of spline plug 14 within slip yoke 12. The lubricant is contained within splined cavity 32 by a plug 38 and a sealing member 40. Sealing member 40 fits over the seal mounting end 42 of the cylindrical body 34 of slip yoke 12 and allows spline plug 14 to slide therethrough.

The preferred sealing member 40 is made out of a resilient material, usually neoprene rubber, with a durameter hardness of 60 to 70 and a minimum tensile strength of 2000 psi (140 kg/cm$^2$). The preferred line call-out designation for sealing member 40, as defined in the 1977 *Society of Automotive Engineers Handbook*, "Classification System for Electrometric Materials for Automotive Applications—SAE J200h" is 2BC620A14B14C12E014E034F17G21. Sealing member 40 has a cylindrical wall 44 joined to a radially inwardly extending wall 46. Wall 44 in turn is joined to a radially inwardly converging truncated conical wall 48. Truncated conical wall 48 is tapered to give it additional strength and terminates at a radially outwardly extending reinforcing rib 50. The diameter of the opening formed by edge intersection 52 between truncated conical wall 48 and reinforcing rib 50 is slightly less than the diameter of the unsplined section 54 of spline plug 14. The resulting close contact between edge 52 and unsplined section 54 of the spline plug 14 will generally prevent lubricant from leaking out of the splined cavity 32 in slip yoke 12 and prevent dust from entering.

The inner surface 56 of the cylindrical wall 44 of sealing member 40 has a circumferential annulus 58 that is formed integrally therewith. Annulus 58 is generally centered on inner surface 56 between radially outwardly extending wall 46 and the outer edge 60 of the cylindrical wall 44, although its position can vary along cylindrical wall 44. The inner diameter of cylindrical wall 44 is generally the same as the outer diameter of the seal mounting end 42 of slip yoke 12.

A circumferential groove 62 is cut in cylindrical body 34 of slip yoke 12 at seal mounting end 42. The diameter of the seal mounting end 42 taken at groove 62 is generally equal to the inner diameter of circumferential annulus 58. In addition, the width of the circumferential annulus 58 is generally the same as that of circumferential groove 62. When assembled, the inner surface 56 of sealing member 40 along cylindrical wall 44 generally complements the outside surface 64 of slip yoke 12 at seal mounting end 42. Since circumferential annulus 58 is fitted within circumferential groove 62, the resilient sealing member 40 is prevented from moving axially relative to slip yoke 12, and the lubricant is contained within splined cavity 32.

While the preferred embodiment of the invention has been illustrated and described herein, variations will become apparent to one of ordinary skill in the art. Accordingly, the invention is not to be limited to the specific embodiment illustrated and described herein and the true scope and spirit of the invention are to be determined by reference to the amended claims.

I claim:

1. A one piece sealing member for a driveline assembly that includes a slip yoke and a spline plug, each with a circular cross section, and tube and weld yoke assembly, said sealing member comprising:
   a cylindrical wall;
   a radially inwardly extending wall at one end of said cylindrical wall;
   a radially inwardly converging truncated conical wall joined to said inwardly extending wall;
   a radially outwardly extending reinforcing rib joined at the inner end of said truncated conical wall wherein the edge formed by the intersection of said reinforcing rib and said truncated conical wall defines a circular opening the diameter of which is slightly less than an unsplined section of said spline plug that passes therethrough; and
   a means for mounting said sealing member on said slip yoke at a first end where said spline plug enters a cavity in said slip yoke.

2. A sealing member as described in claim 1 wherein said sealing member is made of resilient material.

3. A sealing member as described in claim 2 wherein the thickness of said truncated conical wall varies from its juncture with said radially inwardly extending wall to its juncture with said reinforcing rib.

4. A sealing member as described in claim 2 wherein the thickness of said truncated conical wall decreases from its juncture with said radially inwardly extending wall to its juncture with said reinforcing rib.

5. A sealing member as described in claim 3 wherein said sealing member has a durometer hardness of 60 to 70 and a minimum tensile strength of 2000 psi.

6. A sealing member as described in claim 5 wherein said means for mounting said sealing member on said slip yoke is a radially inwardly extending circumferential annulus formed on the inner surface of said cylindrical wall and integral therewith, wherein said annulus fits into and generally complements an annular groove at said first end of said slip yoke so that the outer surface of said slip yoke at said first end mates with the inner surface of said cylindrical wall and annulus.

7. A sealing member as described in claim 6 wherein said circumferential annulus is generally centered on the inner surface of said cylindrical wall.

8. A one piece sealing member for a power transferring, sliding assembly that includes a first member with a generally circular cross section, a first portion of which slides within a cavity in a second member having a generally circular cross section, said sealing member comprising:
   a cylindrical wall, the inner diameter of which is the same as the outer diameter of said second member at a first end at which said first member slidably enters said second member;
   a radially inwardly extending wall at one end of said cylindrical wall;
   a radially inwardly converging truncated conical wall joined to said inwardly extending wall;
   a radially outwardly extending reinforcing rib joined at the inner end of said truncated conical wall, wherein the intersecting edge formed by said reinforcing rib and said truncated conical wall defines a circular opening the diameter of which is slightly less than a second portion of said first member, with a generally circular cross section that slides therethrough; and
   said cylindrical wall further including a radially inwardly extending ring member formed integral therewith, the size of said ring member being such that it fits into and generally complements an annular groove near said first end of said second member so that the outer surface of said second member at said first end mates with the inner surface of said cylindrical wall and said ring member.

9. A sealing member as described in claim 8 wherein said sealing member is made of resilient material.

10. A sealing member as described in claim 9 wherein the thickness of said truncated conical wall decreases from its juncture with said radially inwardly extending wall and its juncture with said reinforcing rib.

11. A sealing member as described in claim 10 wherein said sealing member has a durometer hardness of 60 to 70 and a minimum tensile strength of 2000 psi.

* * * * *